No. 698,934. Patented Apr. 29, 1902.
J. E. GUNDRY.
PITMAN CONNECTION.
(Application filed Feb. 27, 1902.)
(No Model.)
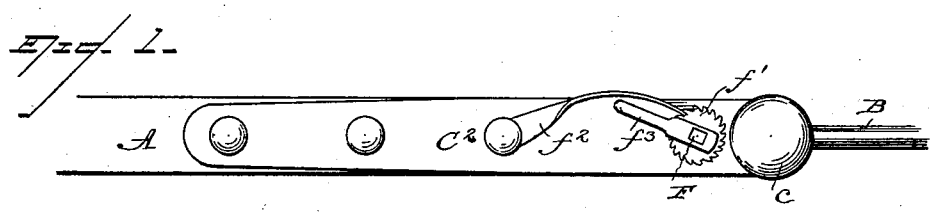
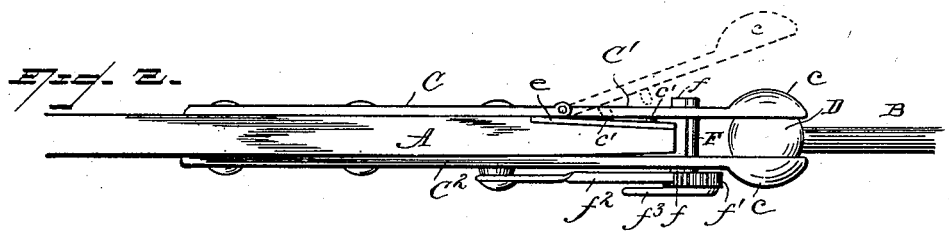
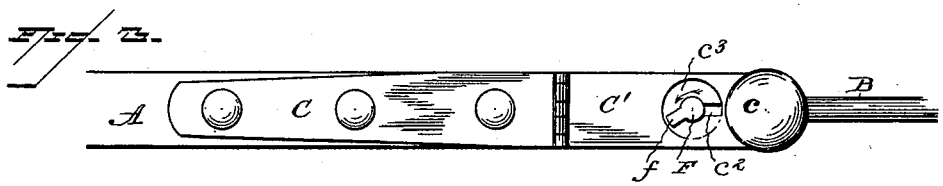
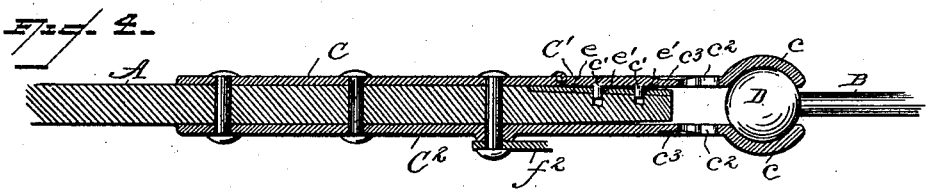
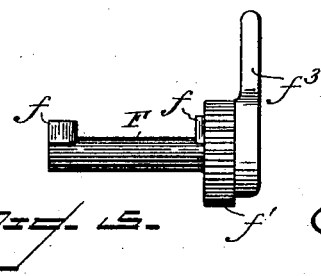
Witnesses
R. J. Beall
M. S. Duvall.
James E. Gundry,
Inventor
by John B. Thomas & Co.,
Attorneys
THE NORRIS PETERS CO., PHOTO-LITHO., WASHINGTON, D. C.

UNITED STATES PATENT OFFICE.

JAMES E. GUNDRY, OF RANKIN, MICHIGAN.

PITMAN CONNECTION.

SPECIFICATION forming part of Letters Patent No. 698,934, dated April 29, 1902.

Application filed February 27, 1902. Serial No. 95,887. (No model.)

*To all whom it may concern:*

Be it known that I, JAMES E. GUNDRY, a citizen of the United States, and a resident of Rankin, in the county of Genesee and State of Michigan, have invented certain new and useful Improvements in Pitman Connections, of which the following is a specification.

The object of this invention is to provide a pitman connection or ball-and-socket joint which is especially adapted for use in harvesting-machines, though it may be applied to other uses where a connection or joint of this character is desired.

The invention contemplates a particular construction of ball-and-socket joint whereby to provide for quickly and conveniently adjusting the parts to compensate for wear and to firmly and securely lock such adjustment, and, furthermore, to provide for readily disconnecting the joint when desired.

The foregoing objects are attained by a peculiar construction and arrangement of parts constituting my improved pitman connection, all as hereinafter described, and more specifically set forth in the appended claims.

In the accompanying drawings, which form a part of this specification, Figure 1 is a side elevation of a pitman connection constructed in accordance with my invention. Fig. 2 is a plan view, the dotted lines showing the socket opened. Fig. 3 is an elevation looking at the opposite side from Fig. 1. Fig. 4 is a transverse sectional view. Fig. 5 is a detail view of the locking-bar.

Like letters of reference indicate like parts in the several views of the drawings.

A designates the pitman-rod, to the outer end of which is attached the socket of the joint, and B designates a rod or arm which carries the ball, and in the application of my invention to a mowing-machine the said rod or arm is fastened to the knife-bar, or obviously the rod or arm may be dispensed with and the ball formed as an integral part of the knife-bar.

In carrying out my invention the end of the pitman-rod A is tapered for a short distance, as shown in Fig. 2, and to the sides of said rod, in the rear of the tapered portion thereof, are attached plates provided at their outer or free ends with cups $c$, one of said plates being preferably formed in two parts C and C', whereby the cup on the part C' may be swung away from the cup on the other plate $C^2$. It will be here noted that by tapering the end of the pitman-rod the projecting end portions of the plates upon which the cups are formed may be brought closer together and that as the plate $C^2$ is attached to the pitman-rod in the rear of the tapered portion the said plate is permitted to have a slight spring movement inward.

The ball D is adapted to bear in the socket formed by the cups on the aforementioned plates, and in order to provide for adjusting said cups and securely holding such adjustment, as well as to form a strong and durable socket or joint, I provide a locking device which I shall now proceed to describe.

A plate $e$ is attached to the side of the pitman-rod, against which the hinged section or plate C' bears, and this plate is provided with holes $e'$, into which fit short pins $c'$, projecting from the inner side of said hinged section or plate C', so that when the socket is closed and the pitman is in operation the pintle of the hinge will be relieved of strain. The connection of the hinged plate is also reinforced by the locking-bar, hereinafter referred to.

In the rear of the cups $c$ each plate C' and $C^2$ is provided with a keyhole-slot $c^2$, and surrounding the circular portion of the slot at the outer side of each plate is an annular inclined surface $c^3$, the inclination beginning at one side of the tail of the slot and ending at the other side thereof.

F designates the locking-bar, by which the cups are closed upon the ball. This locking-bar is adapted to fit the circular portion of the keyhole-slots and is provided with tongues $f$, which are spaced apart, so as to ride upon the inclined surfaces $c^3$ and move the projecting ends of the plates C' and $C^2$ toward each other. The tongue at one end of the locking-bar corresponds in size with the tail of the keyhole-slots, so that the said bar may be passed through the plates. In order to hold this locking-bar adjusted to any extent, it is provided with a ratchet-wheel $f'$, with which engages a spring-pawl $f^2$, the latter being attached to the outer side of the plate $C^2$, and to facilitate the operation of turning said locking-bar a lever or handle $f^3$ is attached or formed integrally at one end thereof.

In adjusting the ball-and-socket joint constructed as hereinbefore described the cups c c are closed upon the ball D, and in turning the locking-bar in the direction indicated by the arrow, Fig. 3, the tongues f of the locking-bar will ride upon the inclined surfaces $c^3$ of the plates and clamp the cups upon the ball to the extent desired, while the spring-pawl $f^2$, being in engagement with the ratchet-wheel $f'$, will hold the locking-bar against backward movement, and thereby securely retain the parts in their adjusted position. The joint or connection can therefore be quickly and conveniently adjusted at any time and without the use of a wrench or other implement, as the handle or lever by which the locking-bar is turned is permanently secured to one end thereof. In some cases I may prefer to merely square the end of the locking-bar instead of providing the handle, and in such an instance the bar would be turned by an ordinary nut-wrench. However, it is preferable to have the handle on the end of the bar, as comparatively little force is required to turn the locking-bar, and the short handle will not interfere. When it is desired to disconnect the parts of the joint, the pawl is released and the locking-bar is turned backward until the tongue at the outer end thereof is on a line with the tail of the keyhole-slot in the hinged plate $C^2$, when the latter can be swung backward, moving the cup at the outer end thereof away from the ball, as indicated in dotted lines, Fig. 2.

The particular construction of joint herein shown and described provides a very simple and effective means for adjustably connecting a ball and socket and permits the socket to be adjusted upon the ball to any desired extent and when so adjusted forms a strong and durable connection and one in which the adjustment is not affected by the vibration of the pitman-rod. The hinged plate when closed upon the ball is reinforced in its connection with the pitman-rod by means of the pins, which engage the holes in the plate, so that the longitudinal strain will not come entirely upon the pintle of the hinge.

Having thus described my invention, what I claim as new, and desire to secure by Letters Patent, is—

1. In a pitman connection, the combination with the pitman-rod, of plates attached to the sides of the pitman-rod and projecting beyond the end thereof, said plates having cups at their free ends and in the rear of said cups provided with keyhole-slots, there being inclined surfaces on the outer sides of the plates and surrounding the circular portions of said keyhole-slots, and a locking-bar having tongues spaced apart, said tongues being adapted to ride upon the inclined surfaces and thereby move the plates toward each other; together with means for holding the locking-bar adjusted.

2. In a pitman connection, the combination with the pitman-rod, of plates attached to the sides of the pitman-rod and projecting beyond the end thereof, one of the plates being hinged at its inner end and both provided with cups at their outer ends and in the rear of said cups with openings having a surrounding inclined surface, a locking-bar having tongues spaced apart and adapted to ride upon the inclined surfaces of the plates, and means for holding the locking-bar.

3. In a pitman connection, the combination with the pitman-rod, of plates attached to the sides of the pitman-rod and projecting beyond the end thereof, one of the plates being hinged at its inner end and provided with short pins engaging corresponding holes in the pitman-rod, cups at the free ends of said plates, each plate having a keyhole-slot and on its outer side an inclined surface surrounding the circular portion of the keyhole-slot, and a locking-bar mounted in the keyhole-slots and provided with tongues spaced apart and adapted to ride upon the inclined surfaces and bring the cups toward each other; together with means for holding the locking-bar.

4. In a pitman connection, the combination with the pitman-rod, of plates attached to the sides of the pitman-rod and provided with cups and with openings having surrounding inclined surfaces at the outer sides of the plates, a locking-bar mounted in the openings and provided with tongues adapted to ride upon the inclined surfaces and move the cups toward each other, a ratchet-wheel on the locking-bar, a pawl carried by one of the plates and engaging said ratchet-wheel, and a handle formed on or attached to the end of the locking-bar, substantially as shown and described.

5. In a pitman connection, the combination with the pitman-rod, of plates attached to the sides of said pitman-rod, one of the plates being hinged at its inner end, cups at the outer end of the plates, there being inclined sur-surfaces surrounding openings in the plates, a locking-bar mounted in said openings, tongues on the locking-bar adapted to ride upon the inclined surfaces, a ratchet-wheel on the locking-bar, a pawl adapted to engage the ratchet-wheel, and a handle or lever secured to one end of the locking-bar, substantially as shown and for the purpose set forth.

In testimony whereof I affix my signature in the presence of two witnesses.

JAMES E. GUNDRY.

Witnesses:
JOHN HILL,
FRANCIS M. STORMES.